(12) United States Patent
Lee et al.

(10) Patent No.: US 8,318,204 B2
(45) Date of Patent: Nov. 27, 2012

(54) PH SENSITIVE BLOCK COPOLYMER AND POLYMERIC MICELLE USING THE SAME

(75) Inventors: Doo Sung Lee, Suwon-si (KR); Min Sang Kim, Suwon-si (KR)

(73) Assignee: Sungkyunkwan University Foundation for Corporate Collaboration, Suwon-si (KR)

( * ) Notice: Subject to any disclaimer, the term of this patent is extended or adjusted under 35 U.S.C. 154(b) by 1539 days.

(21) Appl. No.: 11/573,858

(22) PCT Filed: Dec. 27, 2005

(86) PCT No.: PCT/KR2005/004566
§ 371 (c)(1),
(2), (4) Date: Feb. 16, 2007

(87) PCT Pub. No.: WO2006/098547
PCT Pub. Date: Sep. 21, 2006

(65) Prior Publication Data
US 2007/0218120 A1    Sep. 20, 2007

(30) Foreign Application Priority Data
Mar. 18, 2005  (KR) .................. 10-2005-0022726
Oct. 18, 2005  (KR) .................. 10-2005-0098219

(51) Int. Cl.
*A61K 9/14* (2006.01)
*A61K 47/00* (2006.01)
(52) U.S. Cl. ............... 424/484; 424/489; 514/772.1
(58) Field of Classification Search .............. None
See application file for complete search history.

(56) References Cited

U.S. PATENT DOCUMENTS

| 5,171,308 | A | 12/1992 | Gallagher et al. | |
|---|---|---|---|---|
| 5,545,681 | A | 8/1996 | Honkonen | |
| 6,103,865 | A | 8/2000 | Bae et al. | |
| 6,413,941 | B1 * | 7/2002 | Garnett et al. | 514/44 A |
| 6,667,371 | B2 * | 12/2003 | Ng et al. | 525/462 |
| 6,998,456 | B1 | 2/2006 | Mallapragada et al. | |
| 2002/0131951 | A1 * | 9/2002 | Langer et al. | 424/78.37 |
| 2004/0071654 | A1 | 4/2004 | Anderson et al. | |
| 2005/0158271 | A1 | 7/2005 | Lee et al. | |
| 2005/0220880 | A1 * | 10/2005 | Lewis et al. | 424/486 |

FOREIGN PATENT DOCUMENTS

| JP | 08-188541 | | 7/1996 |
|---|---|---|---|
| JP | 2000-503645 | A | 3/2000 |
| JP | 2004-511596 | A | 4/2004 |
| KR | 2002-0096585 | A | 12/2002 |
| WO | 97/25067 | A2 | 7/1997 |
| WO | 02/31025 | A2 | 4/2002 |

OTHER PUBLICATIONS

Ranucci et al. Macromolecules 1991 24:3747-3752.*
Potineni et al. Journal of Controlled Release 2003 86:223-234.*
Dunn et al. Pharmaceutical Research 1994 11:1016-1022.*
Kwon et al. Advanced Drug Delivery Reviews 1996 21:107-116.*
Kim, Min-Sang, et al., "Recent Advances in Drug Delivery Systems," Twelfth Int'l Symposium, Salt Lake City, UT, Grand America Hotel, Feb. 21-24, 2005 p. 118-119.
Lynn, David M., et al., "Accelerated Discovery of Synthetic Transfection Vectors: Parallel Synthesis and Screening of a Degradable Polymer Library," J. Am. Chem. Soc., 2001, 123, 8155-8156.
Xu, Fu-Jian et al., "pH- and temperature-responsive hydrogels from crosslinked triblock copolymers prepared via consecutive atom transfer radical polymerizations," Biomaterials, 27 (2006) 2787-2797.

* cited by examiner

*Primary Examiner* — Juliet Switzer
*Assistant Examiner* — Caralynne Helm
(74) *Attorney, Agent, or Firm* — Sughrue Mion, PLLC

(57) ABSTRACT

Disclosed is a pH-sensitive block copolymer obtained by copolymerization of: (a) a polyethylene glycol compound (A); and (b) at least one poly(amino acid) compound selected from the group consisting of a poly(β-amino ester) and poly (amido amine) or a copolymer thereof (B). A method for preparing the same block copolymer, and a polymer micelle type drug composition comprising the pH-sensitive block copolymer and a physiologically active substance that can be encapsulated with the block copolymer are also disclosed. The pH-sensitive block copolymer is obtained by polymerization of a hydrophilic polyethylene glycol compound with a pH-sensitive biodegradable poly(amino acid) compound. Therefore, the pH-sensitive block copolymer can form a micelle structure due to its amphiphilicity and ionization characteristics depending on pH variations, and thus can be used as drug carrier for target-directed drug delivery depending on pH variations in the body.

14 Claims, 7 Drawing Sheets

PH SENSITIVE BLOCK COPOLYMER AND POLYMERIC MICELLE USING THE SAME

This is a national stage application of PCT/KR2005/004566 filed on Dec. 27, 2005, which claims priority from Korean patent application 10-2005-0022726 filed on Mar. 18, 2005 and from Korean patent application 10-2005-0098219 filed on Oct. 18, 2005, contents of which are incorporated herein by reference.

TECHNICAL FIELD

The present invention relates to a biodegradable block copolymer useful for pH-sensitive drug carriers, a method for preparing the same, and a polymer micelle type drug composition comprising the above block copolymer. More particularly, the present invention relates to a pH-sensitive block copolymer derived from a poly(β-amino ester) compound, which has water solubility (degree of ionization) depending on pH values but cannot form micelles through the so-called self-assembly mechanism, and a hydrophilic polyethylene glycol compound. The pH-sensitive block copolymer according to the present invention is capable of forming nano-sized polymer micelles (particles) through the self-assembly mechanism, and thus it can be applied as a drug carrier. Additionally, the pH-sensitive block copolymer according to the present invention can form micelles, which are capable of target-directed drug delivery depending on pH variations in the body and have a controllable biodegradation rate, by introducing poly(amido amine) containing an amide group instead of an ester group in its backbone and having a biodegradation rate lower than that of a poly(β-amino ester) so as to control the biodegradation rate in the body. The present invention also relates to a method for preparing the above pH-sensitive block copolymer.

BACKGROUND ART

In general, micelle is referred to as thermally stable and uniform spherical structure formed of amphiphilic low-molecular weight materials (for example, low-molecular weight materials having hydrophilic groups as well as hydrophobic groups). When a water insoluble drug is dissolved and introduced into a compound having such a micelle structure, the drug is present inside the micelle, and the micelle formed thereby is reactive to variations in temperature or pH in the body and thus can accomplish target-directed drug delivery. Therefore, such micelle type compounds have high applicability as carriers for drug delivery.

Korean Patent Application No. 2001-0035265 discloses a method for preparing micelles using polyethylene glycol and a biodegradable polymer. Both materials used in the above method are advantageous in that they have biodegradability and bioaffinity. However, because they are not sensitive to variations in a certain factor such as pH, they have difficulty in drug delivery to the desired site.

Meanwhile, pH in the human body ranges from 7.2 to 7.4. However, it is known that pH in the vicinity of abnormal cells such as cancer cells is a weak acidic pH ranging from 6.0 to 7.2. Accordingly, many attempts are made recently to accomplish drug delivery specific to cancer cells by developing a technical means for carrying out drug delivery at a pH of 7.2 or lower.

U.S. Pat. No. 6,103,865 discloses a polymer using a pH-sensitive compound, sulfonamide. The sulfonamide used in the prior art becomes insoluble at a pH of 7.4 or lower and is ionized at a pH of 7.4 or higher to show acidity. The above pH-sensitive compound shows pH-sensitivity opposite to a target of cancer cell. Therefore, a basic compound is needed for targeting cancer cells.

US Patent No. 2004/0071654 A1 discloses a method for preparing a poly(β-amino ester) compound showing basicity. The poly(β-amino ester) is a kind of poly(β-amino acid) and has an ester group and tertiary amine group in the backbone thereof, and thus shows advantageous ionization characteristics including a change in water solubility depending on pH values.

DISCLOSURE OF INVENTION

Technical Problem

We have recognized that when a poly(β-amino ester) or poly(amido amine) compound, which is a kind of poly(amino acid), is used alone, it shows pH-dependency but cannot form micelles through the self-assembly mechanism. Under the above recognition, we have found that when a poly(β-amino ester) compound or its mixture with a poly(amido amine) compound is copolymerized with a hydrophilic polyethylene glycol compound to form a block copolymer, the resultant block copolymer can form micelle structures capable of drug delivery at a specific pH range and thus can be applied as carrier with a controlled biodegradation rate for use in release-controlled drug delivery. The present invention is based on this finding. Additionally, in order to solve the problem of the high biodegradation rate of a poly (β-amino ester) compound interrupting the action of the block copolymer as drug carrier, we made intensive research into a method for controlling the biodegradation rate of the block copolymer. Finally, we succeeded in controlling the biodegradation rate and maintaining a desired biodegradation rate by copolymerization with a poly(amido amine) (which is a kind of poly(β-amino acid)) having an amide group instead of an ester group in its backbone and thus showing a relatively slow biodegradation rate.

Therefore, it is an object of the present invention to provide a block copolymer obtained by polymerization of a poly(β-amino ester) (PAE), poly(amido amine) (PAA) or a copolymer thereof (PAEA) with a polyethylene glycol (MPEGA) compound, a method for preparing the same block copolymer, and a micelle type drug composition comprising the same block copolymer.

Technical Solution

According to an aspect of the present invention, there is provided a pH-sensitive block copolymer obtained by copolymerization of: (a) a polyethylene glycol compound (A); and (b) at least one poly(amino acid) compound selected from the group consisting of a poly(β-amino ester) and poly(amido amine) or a copolymer thereof (B). There is also provided a method for preparing polymer micelles using the same block copolymer.

According to another aspect of the present invention, there is provided a polymer micelle type drug composition comprising the above pH-sensitive block copolymer and a physiologically active substance that can be encapsulated with the block copolymer.

Hereinafter, the present invention will be explained in more detail.

The present invention is characterized in that a pH-sensitive poly(amino acid) compound, for example, a poly(β-amino ester), poly(amido amine) or a copolymer thereof is copolymerized with a hydrophilic polyethylene glycol compound to provide a block copolymer, which is sensitive to pH variations in the body, forms micelle structures at a specific pH range and has a controlled biodegradation rate in the body.

The pH-sensitive micelle according to the present invention maintains a stable micelle structure at a specific pH range, for example, pH 7.2~7.4 (i.e., pH range of normal cells in the body). However, the pH-sensitive micelle structure collapses in a pH of 7.2 or lower as can be found in abnormal cells such as cancer cells. Therefore, the pH-sensitive micelle can be used as carrier for target-directed drug delivery to cancer cells. More particularly, because tertiary amine groups present in the poly(amino acid), i.e., poly(β-amino ester) (PAE), poly(amido amine) (PAA) or a copolymer thereof (PAEA) shows an increased ionization degree, at a low pH (pH 7.0 or lower), PAE (or PAA, PAEA) becomes totally water soluble and thus cannot form micelles. On the other hand, because PAE (or PAA, PAEA) has a decreased ionization degree at pH 7.4 and shows hydrophobicity, it can form micelles through the self-assembly mechanism.

In addition to delivery of genes and drugs, the block copolymer capable of forming the above-described pH-sensitive micelles can deliver a diagnostic substance to abnormal cells, and thus can also be applied to the filed of diagnosis including diagnostic imaging.

The micelle according to an aspect of the present invention is designed as cancer cell target-directed micelle that forms a micelle at a pH range of 7.2~7.4, which is the same as pH under the normal body conditions, and experiences collapse in the micelle structure at a pH range of 7.2 or lower under abnormal conditions such as cancer cell conditions. However, in addition to the cancer cell target-directed micelles, it is possible to design target-directed micelles for use in the field of genetic variation, etc., by modifying the constitutional elements of the block copolymer, molar ratio and molecular weight of each constitutional element and/or functional groups in the blocks.

Further, according to the present invention, it is possible to control the biodegradation rate of pH-sensitive block copolymer micelles with ease by controlling conditions for forming the pH-sensitive block copolymer, including components of the block copolymer, molar ratio and molecular weight of each component and/or functional groups in the block, in various manners. By doing so, it is possible to accomplish target-directed drug delivery to an adequate site, where drug delivery is needed.

One constitutional element forming the pH-sensitive micelle according to the present invention is a hydrophilic biodegradable compound currently used in the art and generally known to one skilled in the art. Although there is no particular limitation in selection of such hydrophilic biocompatible compounds, it is preferable to use a polyethylene glycol compound. More preferably, a monofunctional polyethylene glycol compound having a functional group such as acrylate or methacrylate at the end thereof is used. For example, a compound end-capped with an acrylate group as represented by the following formula 1 may be used:

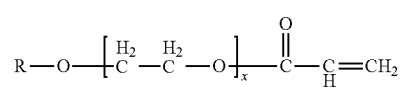

[Formula 1]

wherein R is a hydrogen atom or C1~C6 alkyl group, and x is a natural number ranging from 1 to 10,000.

The alkyl group means a linear or branched lower saturated aliphatic hydrocarbon group and particular examples thereof include methyl, ethyl, n-propyl, isopropyl, n-butyl, sec-butyl, isobutyl, tert-butyl and n-pentyl.

Although there is no particular limitation in molecular weight (Mn) of the polyethylene glycol compound, the polyethylene glycol compound preferably has a molecular weight of 500 to 5000. When the polyethylene glycol compound has a molecular weight away from the above range (for example, a molecular weight of less than 500 or greater than 5000), it is difficult to control the molecular weight of a finally formed block copolymer and to form micelles by using the block copolymer.

Particularly, if the molecular weight is less than 500, the hydrophilic block is too short to cause self-assembly at a specific pH through the hydrophilicity/hydrophobicity balance. Thus, it is difficult to form micelles. Even if any micelles are formed, the micelles are dissolved in water and collapsed easily. On the other hand, if the molecular weight is greater than 5000, the hydrophilic block is too long compared to the molecular weight of a hydrophobic poly(amino acid), resulting in imbalance of hydrophilicity/hydrophobicity. Thus, micelles are not formed at a specific pH, but precipitated.

Another constitutional element forming the pH-sensitive micelle according to the present invention is a poly(amino acid) having hydrophobicity and pH-sensitivity at the same time. Particular non-limiting examples of such poly(amino acid) compounds include poly(β-amino ester) (PAE), poly (amido amine) (PAA) or a copolymer thereof (PAEA).

The above poly(amino acid) compounds, i.e., PAE, PAA and PAEA have ionization property characterized by water solubility varying with pH due to the presence of a tertiary amine group. Therefore, the poly(amino acid) compounds can form/break a micelle structure depending on pH variations in the body. The above compounds may be prepared by a process known to one skilled in the art. In one embodiment of such processes, a bisacrylate or bisacrylamide compound having a double bond is polymerized with an amine compound via the Michael reaction mechanism to produce a poly(amino acid) compound.

The bisacrylate compound used in the above process may be represented by the following formula 2, and non-limiting examples of such bisacrylate compounds include ethylene glycol diacrylate, 1,4-butanediol diacrylate, 1,3-butanediol diacrylate, 1,6-hexanediol diacrylate, 1,6-hexanediol ethoxylate diacrylate, 1,6-hexanediol propoxylate diacrylate, 3-hydroxy-2,2-dimethylpropyl 3-hydroxy-2,2-dimethylpropionate diacrylate, 1,7-heptanediol diacrylate, 1,8-octanediol diacrylate, 1,9-nonanediol diacrylate, 1,10-decanediol diacrylate and mixtures thereof.

[Formula 2]

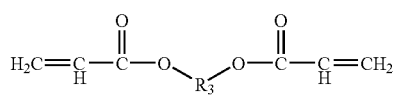

wherein $R_3$ is a C1~C30 alkyl group.

The bisacrylamide compound used in the above process may be represented by the following formula 3, and non-limiting examples of such bisacrylamide compounds include N,N'-methylene bisacrylamide (MDA), N,N'-ethylene bisacrylamide and mixtures thereof. The bisacrylamide compound is reacted with an amine compound such as 4-aminomethylpiperidine (AMPD), N-methyl ethylenediamine (MEDA) or 1-(2-aminoethyl)piperidine (AEPZ) through a conventional reaction mechanism such as Michael reaction mechanism to produce a poly(amino acid) compound.

[Formula 3]

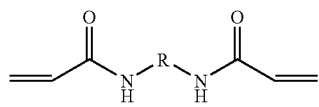

wherein R is a C1~C20 alkyl group.

Additionally, there is no particular limitation in selection of the amine compound as long as the amine compound has an amine group. Preferably, a primary amine represented by the following formula 4, a secondary amine-containing diamine compound represented by the following formula 5, etc., are used.

[Formula 4]

[Formula 5]

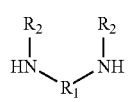

wherein each of $R_1$ and $R_2$ is a C1~C20 alkyl group.

Non-limiting examples of such primary amine compounds include 3-methyl-4-(3-methylphenyl)piperazine, 4-(ethoxycarbonylmethyl)piperazine, 4-(phenylmethyl)piperazine, 4-(1-phenylethyl)piperazine, 4-(1,1-dimethoxycarbonyl) piperazine, 4-(2-(bis-(2-propenyl)amino)ethyl)piperazine, methylamine, ethylamine, butylamine, hexylamine, 2-ethylhexylamine, 2-piperidine-1-ethylamine, C-aziridine-1-yl-methylamine, 1-(2-aminoethyl)piperazine, 4-(aminomethyl) piperazine, N-methylethylenediamine, N-ethylethylenediamine, N-hexylethylenediamine, pycoliamine, adenine, etc. Non-limiting examples of such secondary amine-containing diamine compounds include piperazine, piperidine, pirrolidine, 3,3-dimethylpiperidine, 4,4'-trimethylene dipiperidine, N,N'-dimethyl ethylene diamine, N,N'-diethyl ethylene diamine, imidazolidine, diazepine, etc.

When preparing a pH-sensitive poly(amino acid), i.e., PAE, PAA and PAEA, the bisacrylate or bisacrylamide compound is reacted with the amine compound preferably in a molar ratio of 1:0.5~2.0. When the molar ratio of the amine compound is less than 0.5 or greater than 2.0, it is difficult to form micelles because the resultant polymer has a molecular weight of less than 1000.

The pH-sensitive block copolymer formed by copolymerization of the hydrophilic polyethylene glycol compound with the poly(amino acid) according to the present invention may be represented by the following formula 6, 7 or 8:

[Formula 6]

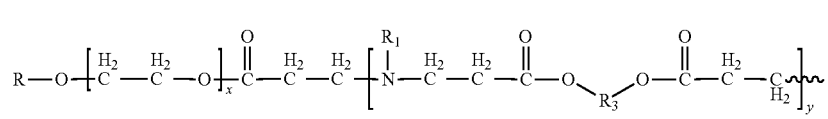

[Formula 7]

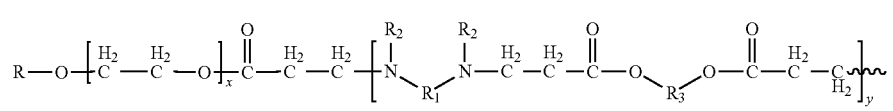

[Formula 8]

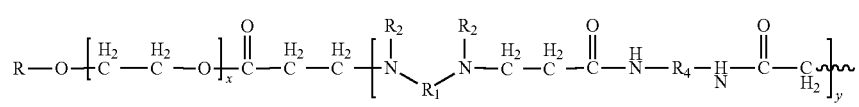

wherein R is a hydrogen atom or C1~C6 alkyl group and x is a natural number ranging from 1 to 10,000;
each of $R_1$ and $R_2$ is a C1~C20 alkyl group;
$R_3$ is a C1~C30 alkyl group;
$R_4$ is a C1~C20 alkyl group; and
Y is a natural number ranging from 1 to 10,000.

The block copolymer represented by the above formula 6, 7 or 8 can form or break micelles depending on pH variations due to its amphiphilic property and pH sensitivity. Preferably, the block copolymer forms micelles at a pH range of 7.0 to 7.4 and the micelles formed thereby collapse at a pH range of 6.5 to 7.0. Particularly, the block copolymer according to the present invention is advantageous in that it has excellent sensitivity within a pH range of ±0.2. Therefore, the block copolymer according to the present invention can be used satisfactorily in various applications requiring sensitivity depending on pH variations in the body (for example, carriers for drug delivery or diagnosis materials).

In addition to the above hydrophilic polyethylene glycol compound and poly(amino acid) compound, the block copolymer according to the present invention may further comprise other units generally known to one skilled in the art, in the scope of the present invention, as long as the block copolymer maintains pH-sensitivity and micelle-forming characteristics.

Although there is no particular limitation in molecular weight of the block copolymer, it is preferable that the block copolymer has a molecular weight of 1,000 to 20,000. When the block copolymer has a molecular weight of less than 1,000, it is difficult to form micelles at a specific pH value and micelles, if any, are easily dissolved in water and thus are broken. On the other hand, when the block copolymer has a molecular weight of greater than 20,000, it cannot form micelles at a specific pH value and precipitates due to a failure in hydrophilicity/hydrophobicity balance.

Although there is no particular limitation in content of the polyethylene glycol-based block (A) in the pH-sensitive block copolymer according to the present invention, the polyethylene glycol-based block is present preferably in an amount of 5 to 95 parts by weight, more preferably of 10 to 40 parts by weight. When the polyethylene glycol-based block is used in an amount of less than 5 parts by weight, the block copolymer does not form micelles but precipitates. When the polyethylene glycol-based block is used in an amount of greater than 95 parts by weight, block content capable of forming the inner parts of micelles is too low to form micelles from the block copolymer, and thus the block copolymer is present in a dissolved state. Additionally, it is possible to form various types of block copolymers including AB diblock type copolymers, ABA or BAB type triblock copolymers or higher block copolymers by controlling the reaction molar ratio of the polyethylene glycol compound to the poly(amino acid) compound (for example, PAE, PAA or PAEA).

The pH-sensitive block copolymer according to the present invention may be prepared by a conventional method known to one skilled in the art. For example, the pH-sensitive block copolymer according to the present invention may be prepared via the following reaction scheme 1, 2 or 3.

[Reaction Scheme 1]

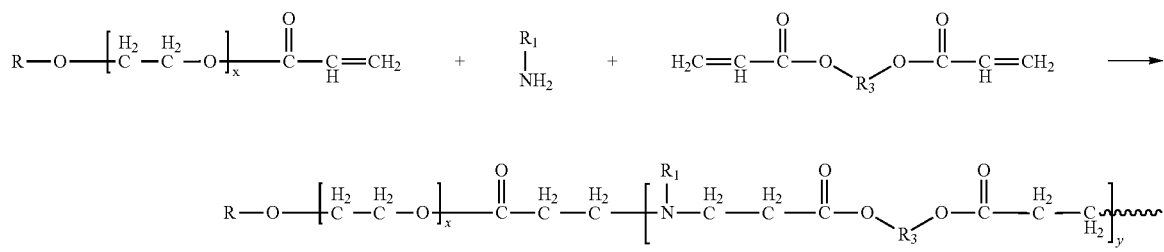

In one embodiment of the method according to the above reaction scheme 1, polyethylene glycol having an acrylate end group (MPEG-A), a primary amine and bisacrylate are subjected to a conventional copolymerization process known to one skilled in the art. Herein, the primary amine and bisacrylate form a poly(β-amino ester) via the Michael addition reaction, and the resultant poly(β-amino ester) is copolymerized with a polyethylene glycol compound end-capped with an acrylate functional group to provide a block copolymer represented by the above formula 6.

[Reaction Scheme 2]

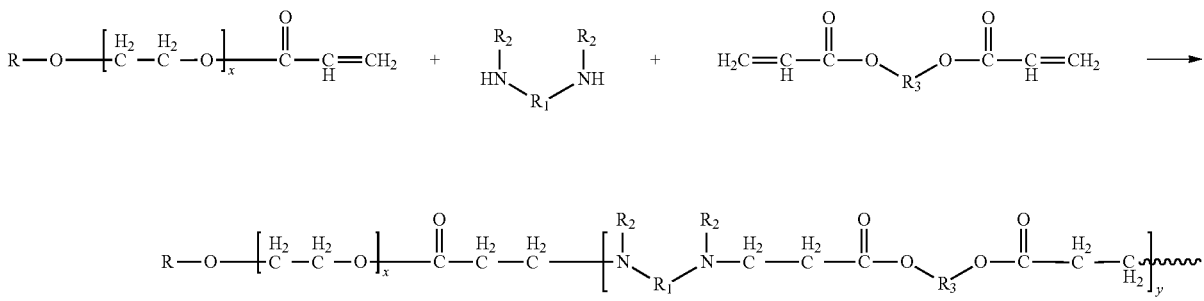

In one embodiment of the method according to the above reaction scheme 2, a block copolymer represented by the above formula 7 is obtained from polyethylene glycol having an acrylate end group (MPEG-A), a secondary amine-containing diamine compound and bisacrylate in the presence of an organic solvent such as chloroform, tetrahydrofuran, dimethyl sulfoxide, dimethyl formamide, methylene chloride, etc.

[Reaction Scheme 3]

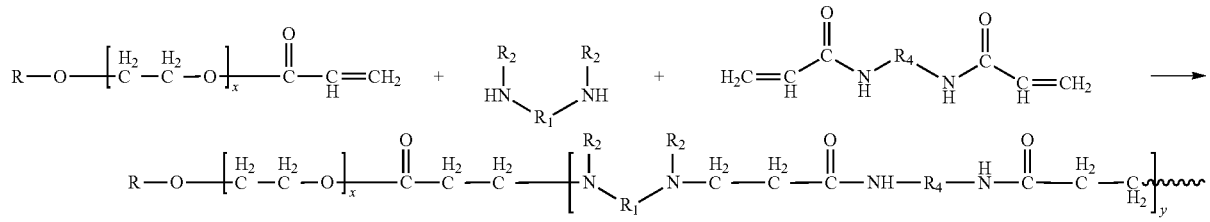

In one embodiment of the method according to the above reaction scheme 3, polyethylene glycol having an acrylate end group (MPEG-A), a primary or secondary amine and bisacrylamide are subjected to a conventional copolymerization process known to one skilled in the art. Herein, the primary or secondary amine and bisacrylamide form a poly (amino ester) referred to also as poly(amido amine) via the Michael addition reaction, and the resultant poly(amido amine) is copolymerized with a polyethylene glycol compound end-capped with an acrylate functional group to provide a block copolymer represented by the above formula 8.

Meanwhile, we used GPC (gel permeation chromatography) to measure the molecular weight of the block copolymer obtained as described above. Also, we used fluorescence spectrometry and DLS (dynamic light scattering) to measure variations in micelle concentration and size depending on pH variations. In fact, we could demonstrate applicability of the pH-sensitive micelle according to the present invention through the above analytical means.

According to another aspect of the present invention, there is provided a polymer micelle type drug composition, which comprises: (a) the above described block copolymer capable of forming micelles depending on pH variations; and (b) a physiologically active substance that can be encapsulated with the block copolymer.

The polymer micelle type drug composition according to the present invention forms micelles when injected into the body. Then, when the polymer micelle type drug composition arrives at a local site with low pH, micelles collapse and the encapsulated active substance is released to accomplish target-directed drug delivery.

Any physiologically active substances can be used and encapsulated with the polymer micelle type block copolymer according to the present invention with no particular limitation. Non-limiting examples of such active substances include anti-cancer agents, antibacterial agents, steroids, antiphlogistic analgesic agents, sexual hormones, immunosuppressants, antiviral agents, anesthetic agents, antiemetic agents, antihistamine agents, etc. In addition to the above active substances, the polymer micelle type drug composition according to the present invention may further comprise conventional additives such as vehicles, stabilizers, pH adjusting agents, antioxidants, preservatives, binders and disintegrating agents.

The polymer micelles according to the present invention may be prepared by a conventional process such as a solvent evaporation process including a stirring, heating, ultrasonic treatment and emulsifying steps, matrix forming process or a dialysis process using an organic solvent.

Although there is no particular limitation in diameter of the polymer micelle, the polymer micelle preferably has a diameter of 10~1000 nm. Additionally, the polymer micelle drug composition may be provided as oral formulation or parenteral formulation. Particularly, the polymer micelle drug composition may be provided for intravenous, intramuscular or subcutaneous injection.

According to still another aspect of the present invention, there is provided use of the pH-sensitive block copolymer as carrier for drug delivery or medical diagnosis.

Herein, any materials are encapsulated with the block copolymer, as long as they are for treatment, prevention or diagnosis of diseases.

According to yet another aspect of the present invention, there is provided a method for preparing a pH-sensitive block copolymer capable of forming micelles, which comprises copolymerizing: (a) at least one compound selected from the group consisting of a compound containing an ester group and a tertiary amine group, and a compound containing an amide group and a tertiary amine group, or a copolymer thereof; and (b) a hydrophilic or amphiphilic compound.

BRIEF DESCRIPTION OF THE DRAWINGS

The foregoing and other objects, features and advantages of the present invention will become more apparent from the following detailed description when taken in conjunction with the accompanying drawings in which.

MODE FOR THE INVENTION

Figure 1:
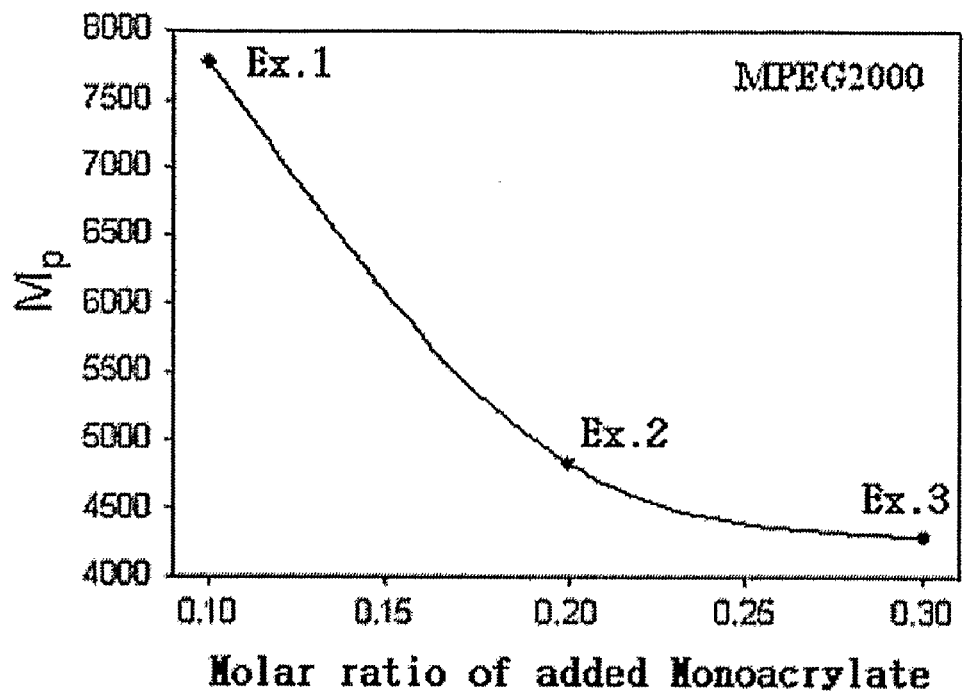
FIG. 1 is a graph showing the results of controlling molecular weight of each of the pH-sensitive block copolymers prepared from polyethylene glycol methyl ether acrylate (MPEG-A) having a molecular weight of 2000 and poly(β-amino ester) according to Examples 1-3, by varying the molar ratio of MPEG-A (Mn=2000)

Reference will now be made in detail to the preferred embodiments of the present invention. It is to be understood that the following examples are illustrative only and the present invention is not limited thereto.

Examples 1~20

Preparation of pH-Sensitive Block Copolymer

Example 1

Preparation of Polyethylene glycol-Poly(β-amino ester) Block Copolymer (PAE)

Polyethylene glycol methyl ether (MPEG2000, Mn=2000) and acryloyl chloride were reacted in the presence of methylene chloride containing triethyl amine (TEA) added thereto. Then, the reaction mixture was extracted with diluted aqueous hydrochloric acid solution and was precipitated with n-hexane to obtain polyethylene glycol methyl ether acrylate (MPEG2000-A, Mn=2000) as precipitate. 0.1 moles of MPEG2000-A was introduced into a two-necked round bottom flask along with 1 mole of 4,4'-trimethylene dipiperidine (as diamine component) and 1 mole of 1,6-hexanediol diacrylate. Next, the reaction flask was depressurized and purged with nitrogen.

Chloroform was used as the reaction solvent and the reaction was carried out at 50° C. for 48 hours to obtain polyethylene glycol-poly(β-amino ester) block copolymer (MPEGA-PAE) having a molecular weight (Mp) of 7700.

Example 2

Example 1 was repeated to obtain MPEGA-PAE block copolymer having a molecular weight (Mp) of 4800, except that polyethylene glycol methyl ether acrylate MPEG2000-A) was used in an amount of 0.2 moles instead of 0.1 moles.

Example 3

Example 1 was repeated to obtain MPEGA-PAE block copolymer having a molecular weight (Mp) of 4400, except that polyethylene glycol methyl ether acrylate MPEG2000-A) was used in an amount of 0.3 moles instead of 0.1 moles.

Example 4

Example 1 was repeated to obtain MPEGA-PAE block copolymer having a molecular weight (Mp) of 13500, except that 0.1 moles of MPEG5000-A, which was prepared by using MPEG5000 instead of MPEG2000, were used.

Example 5

Example 1 was repeated to obtain MPEGA-PAE block copolymer having a molecular weight (Mp) of 12500, except that 0.4 moles of MPEG5000-A, which was prepared by using MPEG5000 instead of MPEG2000, were used.

Example 6

Example 1 was repeated to obtain MPEGA-PAE block copolymer having a molecular weight (Mp) of 8800, except that 0.1 moles of MPEG5000-A, which was prepared by using MPEG5000 instead of MPEG2000, and 0.8 moles of 4,4'-trimethylene dipiperidine were used.

Example 7

Example 1 was repeated to obtain MPEGA-PAE block copolymer having a molecular weight (Mp) of 20000, except that 0.1 moles of MPEG5000-A, which was prepared by using MPEG5000 instead of MPEG2000, and 1.1 moles of 4,4'-trimethylene dipiperidine were used.

Example 8

Example 1 was repeated to obtain MPEGA-PAE block copolymer having a molecular weight (Mp) of 7900, except that 0.1 moles of MPEG5000-A, which was prepared by using MPEG5000 instead of MPEG2000, and 1.3 moles of 4,4'-trimethylene dipiperidine were used.

Example 9

Example 1 was repeated to obtain MPEGA-PAE block copolymer having a molecular weight (Mp) of 6900, except that 0.1 moles of MPEG5000-A, which was prepared by using MPEG5000 instead of MPEG2000, and 1.5 moles of 4,4'-trimethylene dipiperidine were used.

Example 10

Example 1 was repeated to obtain MPEGA-PAE block copolymer having a molecular weight (Mp) of 6200, except that 0.1 moles of MPEG5000-A, which was prepared by using MPEG5000 instead of MPEG2000, was used and 4,4'-trimethylene dipiperidine was substituted by piperazine.

Example 11

0.1 moles of MPEG5000-A obtained by using MPEG5000 was used in order to control the biodegradation rate of MPEG-PAE block copolymer. 0.2 moles of N,N'-methylene bisacrylamide serving as diacrylamide for controlling biodegradation rate was added individually to 1 moles of piperazine (amine compound) and 0.8 moles of 1,6-hexanediol diacrylate. The above reaction mixture was subjected to polymerization to obtain MPEGA-PAEA block copolymer having a molecular weight of 13,200.

Example 12

Example 11 was repeated to obtain MPEGA-PAEA block copolymer having a molecular weight (Mp) of 13,700, except that 0.4 moles of N,N'-methylene bisacrylamide serving as diacrylamide for controlling biodegradation rate was added to 0.6 moles of 1,6-hexanediol diacrylate.

Example 13

Example 11 was repeated to obtain MPEGA-PAEA block copolymer having a molecular weight (Mp) of 13,400, except that 0.6 moles of N,N'-methylene bisacrylamide serving as diacrylamide for controlling biodegradation rate was added to 0.4 moles of 1,6-hexanediol diacrylate.

Example 14

Example 11 was repeated to obtain MPEGA-PAEA block copolymer having a molecular weight (Mp) of 13,300, except that 0.8 moles of N,N'-methylene bisacrylamide serving as diacrylamide for controlling biodegradation rate was added to 0.2 moles of 1,6-hexanediol diacrylate.

Example 15

0.1 moles of MPEG5000-A, which was prepared by using MPEG5000, 1 mole of piperazine as the amine compound and 1 mole of N,N'-methylene bisacrylamide as the diacrylamide compound were used to obtain MPEGA-PAA block copolymer having a molecular weight of 13,800.

Example 16

Example 11 was repeated to obtain MPEGA-PAEA block copolymer having a molecular weight (Mp) of 10,200, except that 0.1 moles of MPEG2000-A prepared from MPEG2000 was used instead of 0.1 moles of MPEG5000-A.

Example 17

Example 11 was repeated to obtain MPEGA-PAEA block copolymer having a molecular weight (Mp) of 10,400, except that 0.1 moles of MPEG2000-A prepared from MPEG2000 was used, and 0.4 moles of N,N'-methylene bisacrylamide serving as diacrylamide for controlling biodegradation rate was added to 0.6 moles of 1,6-hexanediol diacrylate.

Example 18

Example 11 was repeated to obtain MPEGA-PAEA block copolymer having a molecular weight (Mp) of 10,700, except that 0.1 moles of MPEG2000-A prepared from MPEG2000 was used, and 0.6 moles of N,N'-methylene bisacrylamide serving as diacrylamide for controlling biodegradation rate was added to 0.4 moles of 1,6-hexanediol diacrylate.

Example 19

Example 16 was repeated to obtain MPEGA-PAEA block copolymer having a molecular weight (Mp) of 10,300, except that 0.1 moles of MPEG2000-A prepared from MPEG2000 was used, and 0.8 moles of N,N'-methylene bisacrylamide serving as diacrylamide for controlling biodegradation rate was added to 0.2 moles of 1,6-hexanediol diacrylate.

Example 20

0.1 moles of MPEG2000-A prepared from MPEG2000, 1 mole of piperazine as the amine compound, and 1 mole of N,N'-methylene bisacrylamide as the diacrylamide compound were used to obtain MPEGA-PAA block copolymer having a molecular weight of 10,600.

COMPARATIVE EXAMPLES 1 AND 2

Comparative Example 1

Example 1 was repeated to obtain MPEGA-PAE block copolymer having a molecular weight (Mp) of 8000, except that 0.1 moles of MPEG500-A prepared from MPEG400 was used instead of MPEG2000.

The MPEGA-PAE block copolymer was observed for behaviors depending on pH variations. After the observation, the block copolymer could not form micelles. This indicates that the block copolymer, whose hydrophilic block is too short, cannot permit self-assembly through the hydrophilicity/hydrophobicity balance at a specific pH. Thus, the block copolymer cannot form micelles. Even if any micelles are formed, they are dissolved and collapsed in water.

Comparative Example 2

Example 1 was repeated to obtain MPEGA-PAE block copolymer having a molecular weight (Mp) of 14500, except that 0.1 moles of MPEG6000-A prepared from MPEG6000 was used instead of MPEG2000.

The MPEGA-PAE block copolymer was observed for behaviors depending on pH variations. After the observation, the block copolymer could not form micelles, like the block copolymer according to Comparative Example 1. This indicates that the hydrophilic block is too long compared to the molecular weight of the hydrophobic poly(amino acid), resulting in imbalance of hydrophilicity/hydrophobicity. Thus, the block copolymer does not form micelles at a specific pH, but is precipitated.

Experimental Example 1

Determination of Molecular Weight of pH-Sensitive Block Copolymers

The following analytical procedure was carried out in order to measure the molecular weight of a pH-sensitive block copolymer according to the present invention.

The MPEGA-PAE, MPEGA-PAA or MPEGA-PAEA block copolymers according to the above Examples 1~15 were used and subjected to a GPC (gel permeation chromatography) analytical instrument (available from Waters Co.) in order to check their molecular weight controllability.

Figure 2:
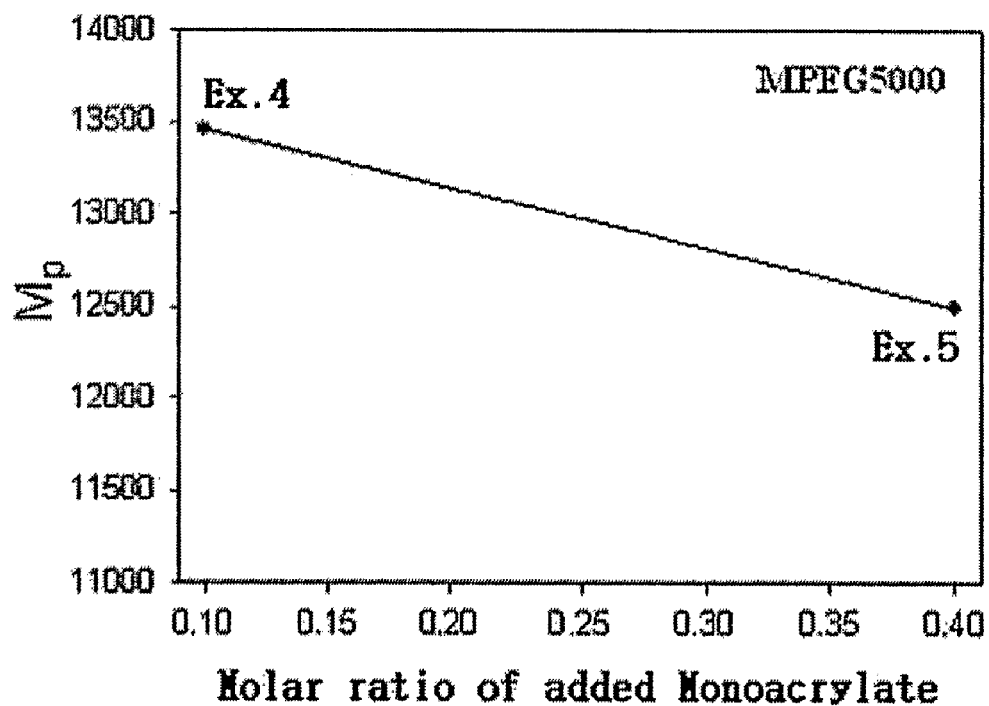
FIG. 2 is a graph showing the results of controlling molecular weight of each of the pH-sensitive block copolymers prepared from MPEG-A having a molecular weight of 5000 and poly(β-amino ester) according to Examples 4 and 5, by varying the molar ratio of MPEG-A (Mn=5000)

First, the MPEGA-PAE block copolymers according to the above Examples 1~5 were analyzed for their molecular weights. It was shown that MPEG2000-A could be used to control the molecular weight of a finally formed copolymer (see FIG. 1). However, it was difficult to control the molecular weight of a finally formed copolymer by using MPEG5000-A (see FIG. 2).

Figure 3:
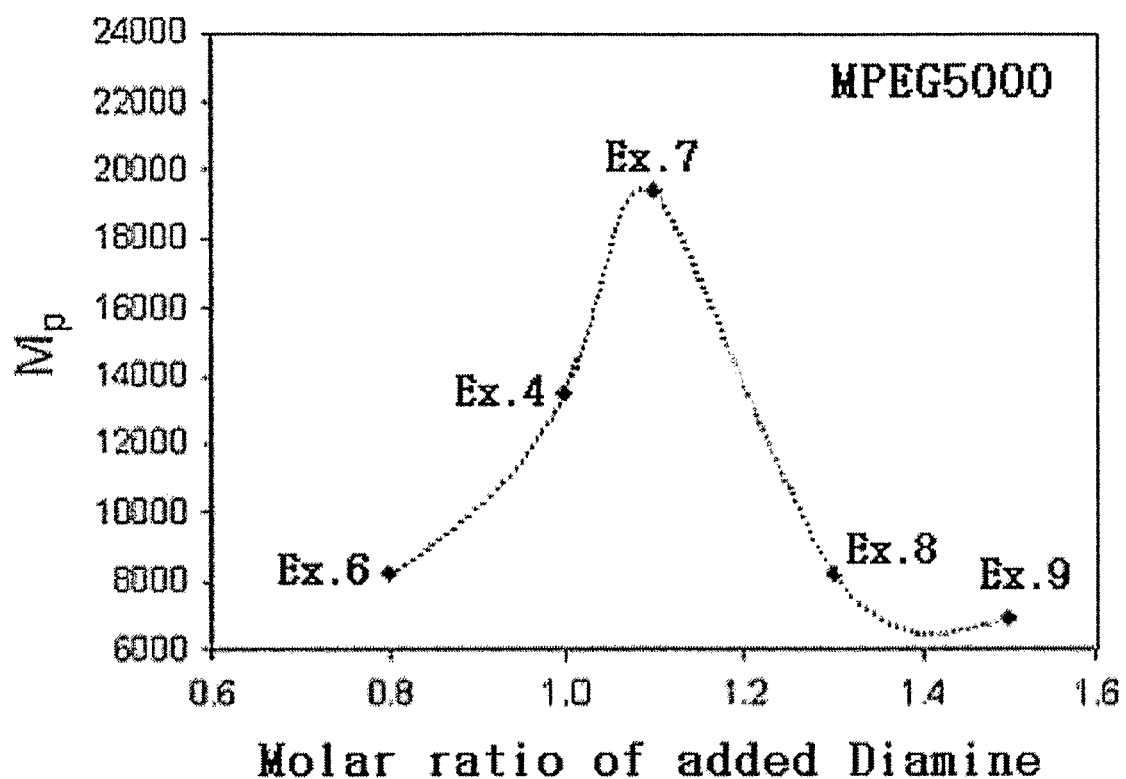
FIG. 3 is a graph showing the results of controlling molecular weight of each of the pH-sensitive block copolymers according to Examples 4, 6 and 9 by varying the molar ratio of diamine.

In order to demonstrate the molecular weight controllability of copolymers obtained from MPEG5000-A, the MPEGA-PAE block copolymers according to Examples 4, 6 and 9 each using a different amount of diamine under the same amount of MPEG-A and bisacrylate were analyzed for their molecular weights. After the analysis, it could be seen that it was possible to control the molecular weight of a finally formed copolymer as well as to control the structure of a finally formed copolymer to a diblock or triblock structure, even if MPEG5000-A was used (see FIG. 3). In fact, when 1 mole of diamine was added, a copolymer with a molecular weight of about 13,000 was obtained. It was assumed that the resultant copolymer was a diblock copolymer formed of MPEG with a molecular weight of 5000 and PAE with a molecular weight of 8000. Further, when the diamine content was increased to 1.1 moles, molecular weight of the resultant copolymer increased to about 19,000 contrary to the general expectation that such an unbalanced molar ratio results in a drop in molecular weight. This indicates that a triblock copolymer formed of MPEG-A, PAE and MPEG-A was obtained. However, when the diamine content was further increased to 1.3 moles and 1.5 moles, molecular weight of the resultant block copolymer rather decreased than increased. It is thought that this results from the fact that such a significantly unbalanced molar ratio affects the polymerization degree.

Experimental Example 2

Determination of Micelle Behaviors Depending on pH Variations

The following experiment was performed to observe behaviors of the pH-sensitive block copolymer according to the present invention depending on pH variations.

The block copolymers with different molecular weights according to the above Examples 1~4 and 10 were used and subjected to a fluorescence spectrometer.

Because it was not possible to observe the micelle behaviors directly with a fluorescence spectrometer, pyrene, a hydrophobic luminescent material, was used.

After a buffer solution (pH 6.0) containing $10^{-6}$M of pyrene was prepared, each copolymer obtained from the above Examples 1~4 and 10 was dissolved therein at a concentration of 1 mg/ml, and the resultant solution was adjusted to pH 8.0. Then, pH was varied to a range of 5.5~8.0 by adding 5M aqueous hydrochloric acid solution dropwise to the solution, while measuring variations in energy emitted due to a change in concentration of the micelle through the fluorescence spectrometer.

Figure 4:
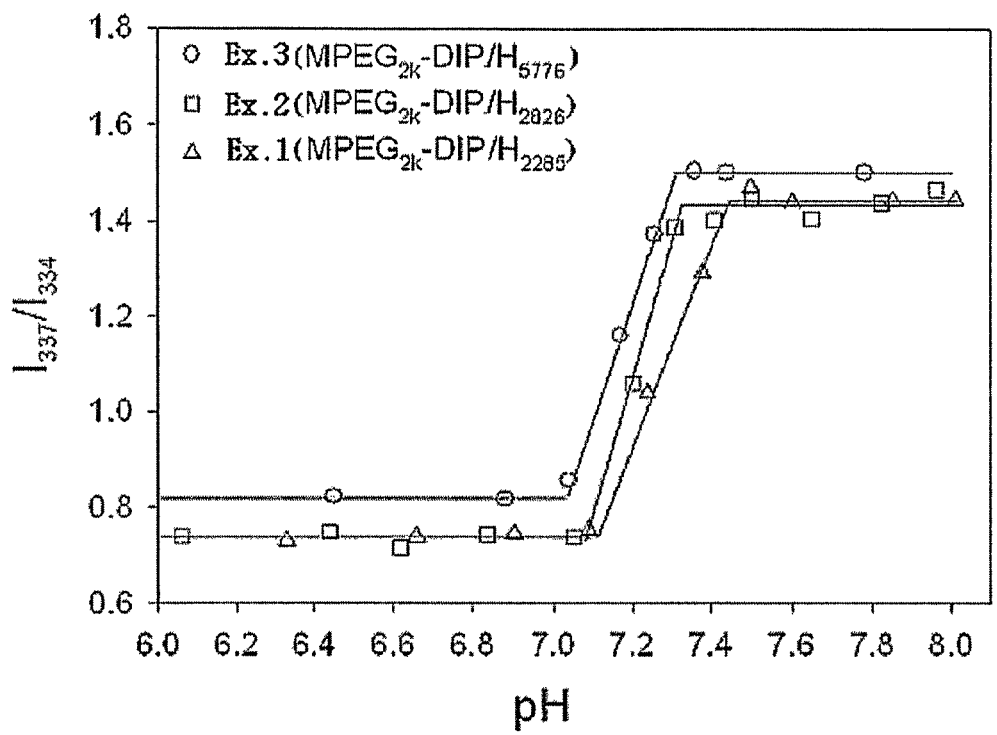
FIG. 4 is a graph showing the behavior of micelles of the block copolymers according to Examples 1-3, depending on pH variations.

First, the block copolymers using polyethylene glycol with a molecular weight of 2000 according to examples 1, 2 and 3 were observed for their behaviors depending on pH variations. It could be seen that as the molecular weight of poly(β-amino ester) block copolymer increases, there was a slight change in the pH range where micelles collapsed (see FIG. 4). This indicates that such a change in molar ratio of the hydrophobic poly(β-amino ester) block and hydrophilic polyethylene glycol block in the final block copolymer causes a slight variation in ionization degree depending on pH variations, resulting in a change in micelles behaviors.

Figure 5:
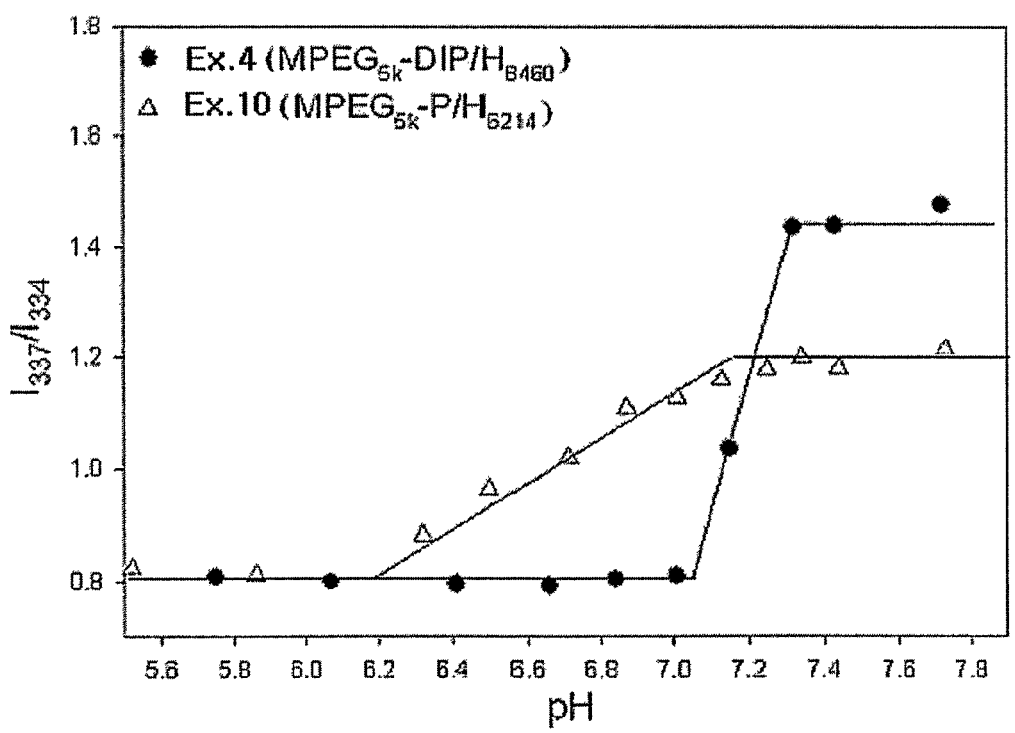
FIG. 5 is a graph showing the behavior of micelles of the block copolymers, prepared by using piperazine and 4,4'-trimethylene dipiperidine according to Examples 4 and 10, respectively, depending on pH variations.

Additionally, after observing the copolymer micelles using different diamine compounds according to Examples 4~10, it could be seen that the copolymer according to Example 4 experienced collapse of micelles in a narrower pH range compared to the others (see FIG. 5). It is thought that the above phenomenon results from a difference in ionization tendency between piperazine and 4,4'-trimethylene dip-piperidine. Therefore, because micelles collapse in a relatively narrower pH range in the case of 4,4'-trimethylene dipiperidine, it is possible to obtain a block copolymer that is more sensitive to pH variations.

Experimental Example 3

Determination of Micelle Behaviors of Block Copolymers Depending on pH Variations The following experiment was carried out to observe variations in micelle behaviors of the pH-sensitive block copolymer according to the present invention at a specific pH value.

3-1. Measurement of CMC (Critical Micelle Concentration)

The copolymer according to Example 4 was measured for its CMC at pH 7.01, pH 7.24 and pH 7.4.

Figure 6:
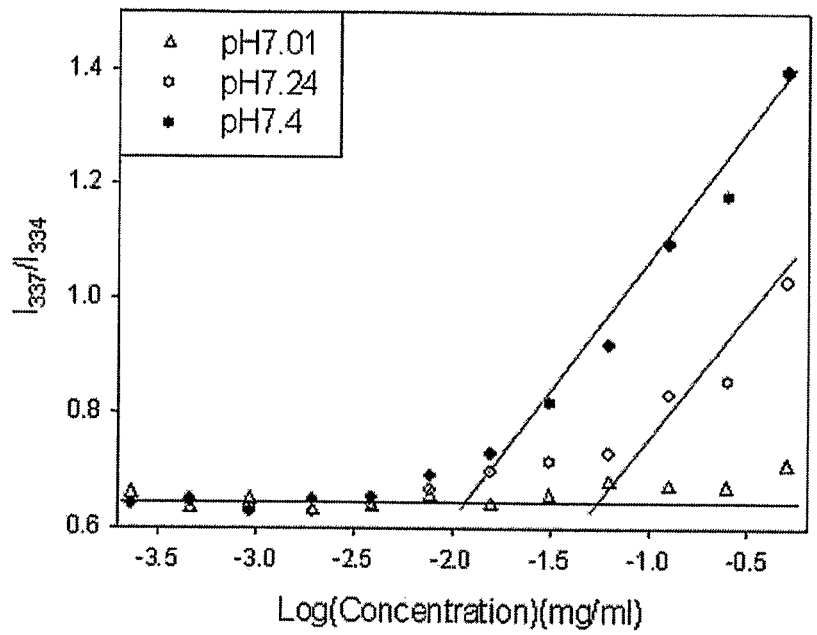
FIG. 6 is a graph showing a change in CMC (critical micelle concentration) of the block copolymer according to Example 4, depending on pH variations.

After the measurement, it could be seen that the block copolymer according to the present invention formed stable micelles at pH 7.4 and could not form micelles at pH 7.0 (see FIG. 6). This indicates that the block copolymer cannot form micelles at a low pH (pH 7.0 or lower), because the tertiary amine groups present in the poly(β-amino ester) have an increased ionization degree and the PAE is totally converted into a water soluble substance so that the resultant block copolymer cannot form micelles. Additionally, as can be seen from the above result, because PAE has a decreased ionization degree at pH 7.4 and becomes hydrophobic, the block copolymer can form micelles through the self-assembly mechanism.

3-2. Measurement of Micelle Size

The copolymer according to Example 4 was observed for its micelle size by using a DLC (Dynamic Light Scattering) instrument at pH 8.01, pH 7.42, pH 7.23, pH 6.68 and pH 6.30.

Figure 7:
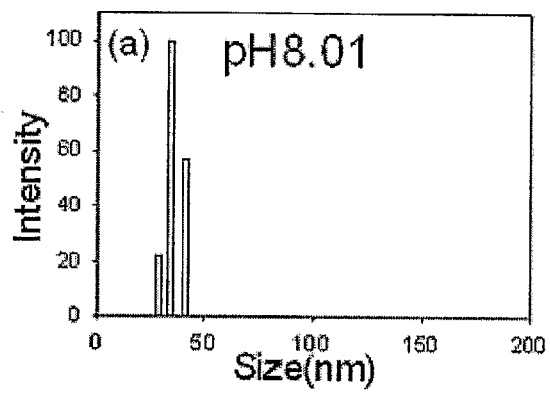
FIG. 7 is a graph showing a change in micelle sizes of the block copolymer according to Example 4, depending on pH variations and particularly showing the micelle size at pH 8.01.
Figure 8:
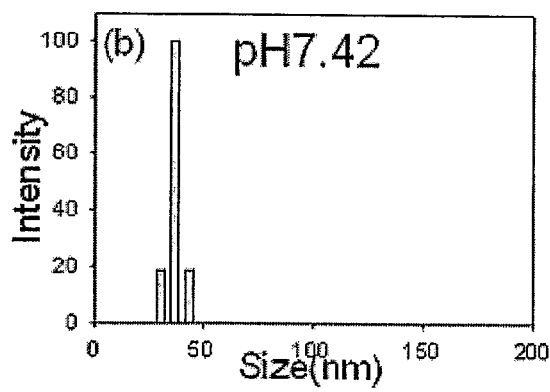
FIG. 8 is a graph showing a change in micelle sizes of the block copolymer according to Example 4, depending on pH variations and particularly showing the micelle size at pH 7.42.
Figure 9:
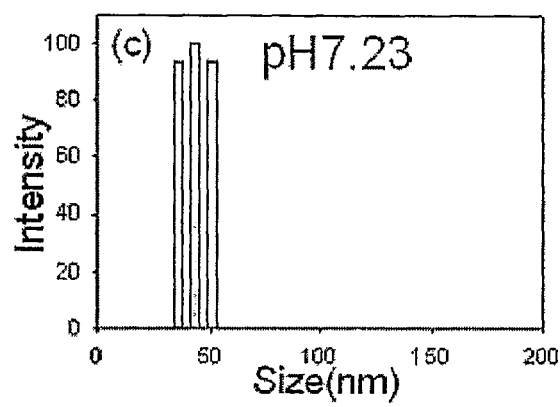
FIG. 9 is a graph showing a change in micelle sizes of the block copolymer according to Example 4, depending on pH variations and particularly showing the micelle size at pH 7.23.
Figure 10:
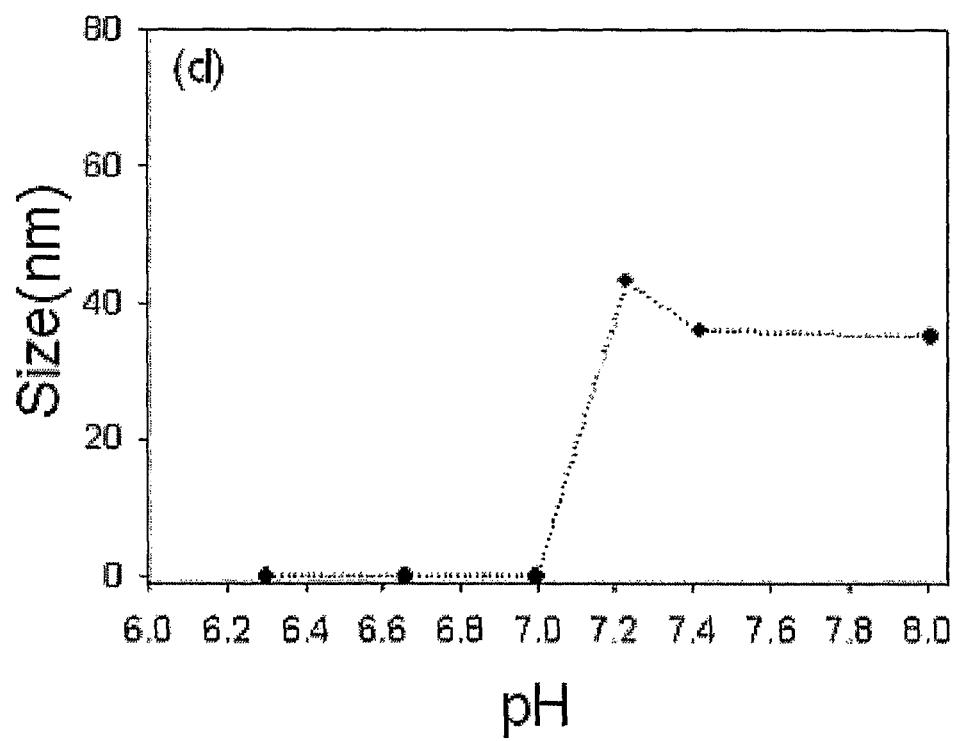
FIG. 10 is a graph showing a change in micelle sizes of the block copolymer according to Example 4 in a pH range of 6.3 to 8.0.

It could be seen that micelles having a certain size were present at pH 7.0 or higher (see FIGS. 7, 8 and 9), while no micelles were formed at a pH less than 7.0 due to the complete ionization of poly(β-amino ester) (see FIG. 10).

As can be seen from the above experimental results, the pH-sensitive block copolymer according to the present invention can form and break polymer micelles due to the amphiphilicity of the copolymer itself and through the reversible self-assembly mechanism depending on pH variations.

Experimental Example 4

Evaluation for Biodegradation Rate of Block Copolymer Micelles Depending on pH Variations The following experiment was carried out to observe variations in micelle behaviors of the pH-sensitive block copolymer according to the present invention at a specific pH value.

The copolymer according to Example 4 using poly(β-amino ester), which has a relatively high biodegradation rate due to ester groups present in the backbone, and the copolymer according to example 11 using poly(amido amine), which has a relatively low biodegradation rate due to amide groups present in the backbone, were used to carry out the experiment. Additionally, block copolymers according to Examples 11~20, which were prepared by controlling the amount and proportion of the components forming the block copolymer according to Example 11 (for example, the amine compound and poly(amido amine) as an agent for controlling biodegradation rate), were also used in the experiment.

Figure 11:
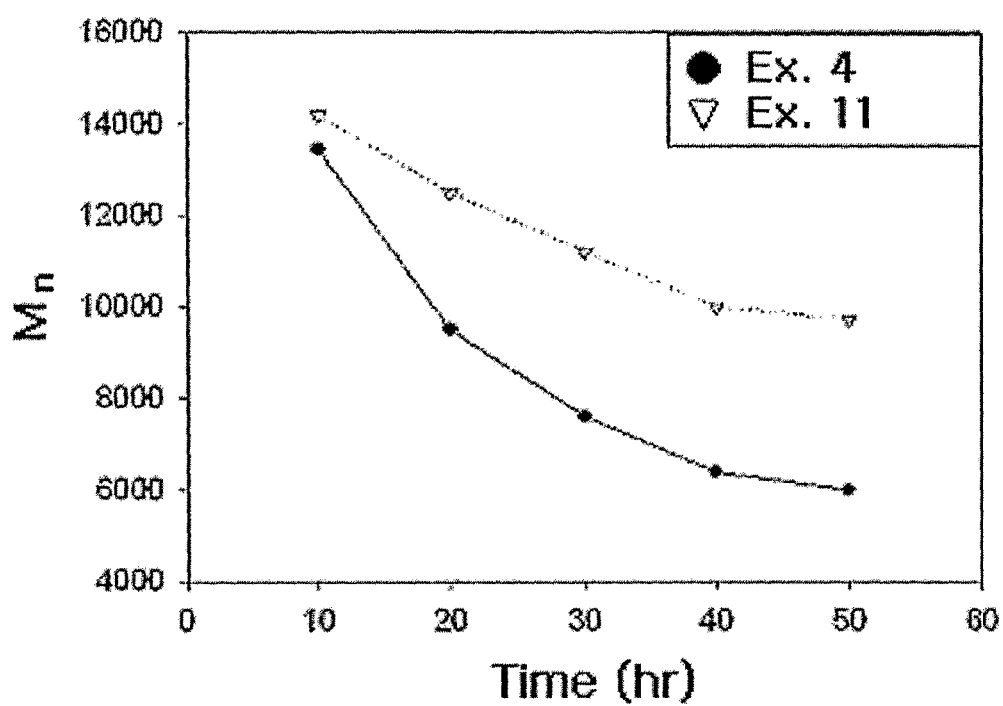
FIG. 11 is a graph showing a change in molecular weight of each of the block copolymers according to Examples 4 and 11 with the lapse of time at pH 7.4.
Figure 12:
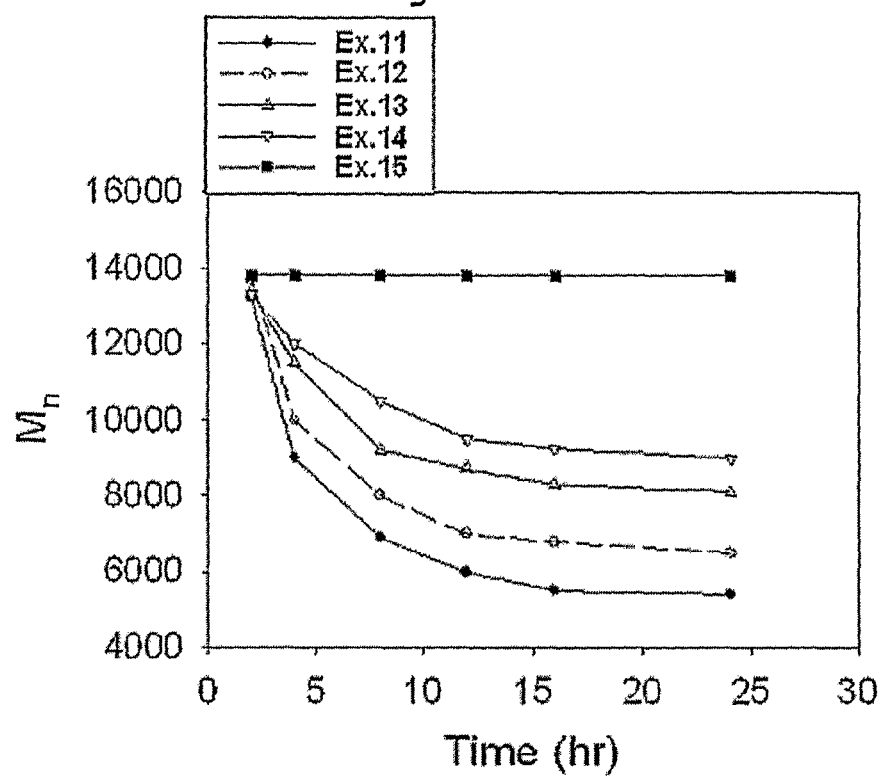
FIG. 12 is a graph showing a change in molecular weight of each of the block copolymers according to Examples 11 to 15 with the lapse of time at pH 7.4.
Figure 13:
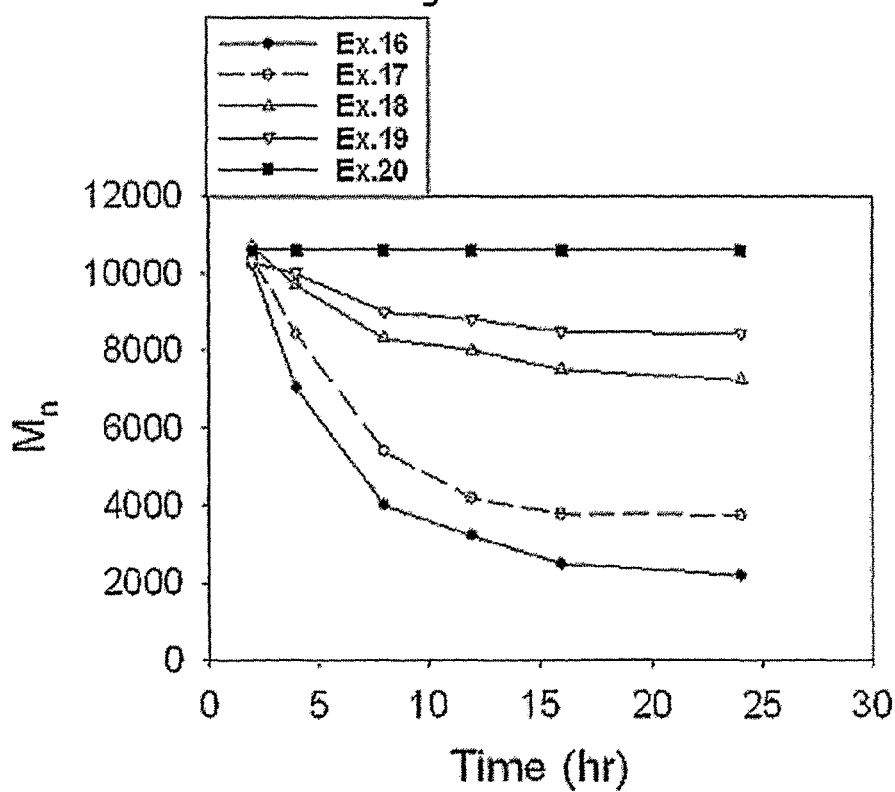
FIG. 13 is a graph showing a change in molecular weight of each of the block copolymers according to Examples 16 to 20 with the lapse of time at pH 7.4.

Each block copolymer was measured for its molecular weight with time at pH 7.4. After the measurement, it could be seen that the block copolymer micelles according to example 4 showed a molecular weight reduced by at least 50% of the original molecular weight within 30 hours. This indicates that the micelles have a relatively high biodegradation rate. On the other hand, the block copolymer micelle according to example 11 showed a relatively low biodegradation rate (see FIG. 11). Additionally, after measuring the block copolymer micelles according to Examples 11~20, it could be seen that it was possible to control the biodegradation rate of the micelles with ease by controlling the amount and molar ratio of each component forming the block copolymer micelles (see FIG. 12). Therefore, the above results demonstrates that the pH-sensitive block copolymer according to the present invention can be controlled with ease so as to have a desired biodegradation rate, and can be designed so as to maintain a desired biodegradation rate by using, as a kind of poly(β-amino acid), a copolymer with poly(amido amine) that has a relatively low biodegradation rate in the body.

INDUSTRIAL APPLICABILITY

As can be seen from the foregoing, the pH-sensitive block copolymer according to the present invention is obtained by polymerization of a hydrophilic polyethylene glycol compound with a poly(amino acid) compound that has water soluble characteristics depending on pH variations but cannot form micelles through the self-assembly mechanism (for example, poly(β-amino ester) or poly(amido amine) compound). Therefore, the pH-sensitive block copolymer according to the present invention has excellent pH sensitivity and can form polymer micelles reversibly through the self-assembly mechanism, and thus can be used as drug carrier for target-directed drug delivery depending on pH variations in the body and as diagnostic material.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

The invention claimed is:

1. A pH-sensitive block copolymer comprising a polyethylene glycol-based block (A) and a pH-sensitive block (B);
    wherein the polyethylene glycol-based block (A) comprises a functional group selected from the group consisting of acrylate and methacrylate, and has a molecular weight of 500-5,000;
    wherein the pH-sensitive block (B) is at least one poly(amino acid) compound selected from the group consisting of a poly(β-amino ester), a poly(amido amine), and a copolymer thereof, and formed by polymerization of an amine compound (E) and a bisacrylate or bisacrylamide compound (F);
    wherein the bisacrylate or bisacrylamide compound (F) and the amine compound (E) are used in a molar ratio of 1:0.5-2.0, and
    wherein said pH-sensitive block copolymer is a AB diblock type copolymer,
    wherein the ratio of the polyethylene glycol-based block (A): the pH-sensitive block (B) is 10-40 wt %:90-60 wt %, and
    wherein the pH-sensitive block copolymer forms micelles by self-assembly at a pH ranging from 7.2 to 7.4, said micelles collapsing at a pH ranging from 6.5 to 7.0.

2. The pH-sensitive block copolymer according to claim 1, wherein the poly(amino acid) compound selected from the group consisting of the poly(β-amino ester), the poly(amido amine) and the copolymer thereof comprises a tertiary amine group, which ionizes at pH 7.0 or lower.

3. The pH-sensitive block copolymer according to claim 1, which is a compound represented by the following formula 6, 7 or 8:

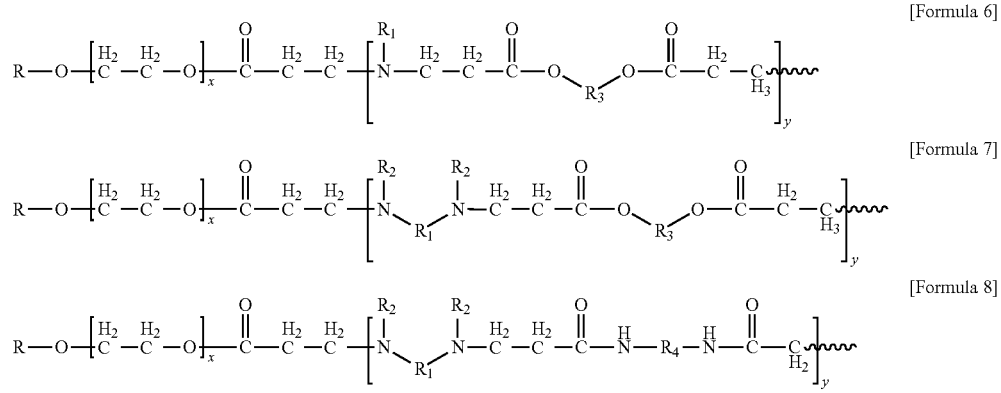

[Formula 6]

[Formula 7]

[Formula 8]

wherein R is a hydrogen atom or C1-C6 alkyl group and x is a natural number ranging from 1 to 10,000;
each of $R_1$ and $R_2$ is a C1-C20 alkyl group;
$R_3$ is a C1-C30 alkyl group;
$R_4$ is a C1-C20 alkyl group; and
Y is a natural number ranging from 1 to 10,000.

4. The pH-sensitive block copolymer according to claim 1, which has a molecular weight of 1000 to 20,000.

5. The pH-sensitive block copolymer according to claim 1, wherein the bisacrylate compound is at least one selected from the group consisting of ethylene glycol diacrylate, 1,4-butanediol diacrylate, 1,3-butanediol diacrylate, 1,6-hexanediol diacrylate, 1,6-hexanediol ethoxylate diacrylate, 1,6-hexanediol propoxylate diacrylate, 3-hydroxy-2,2-dimethylpropyl 3-hydroxy-2,2-dimethylpropionate diacrylate, 1,7-heptanediol diacrylate, 1,8-octanediol diacrylate, 1,9-nonanediol diacrylate and 1,10-decanediol diacrylate.

6. The pH-sensitive block copolymer according to claim 1, wherein the bisacrylamide compound is at least one selected from the group consisting of N,N'-methylene bisacrylamide and N,N'-ethylene bisacrylamide.

7. The pH-sensitive block copolymer according to claim 1, wherein the amine compound is a primary amine compound or a secondary amine-containing diamine compound.

8. The pH-sensitive block copolymer according to claim 7, wherein the primary amine compound is at least one selected from the group consisting of 3-methyl-4-(3-methylphenyl) piperazine, 3-methylpiperazine, 4-(bis) piperazine, 4-(phenylmethyl)piperazine, 4-(1-phenylethyl)piperazine, 4-(2-(bis-(2-propenyl)amino)ethyl)piperazine, methylamine, ethylamine, butylamine, hexylamine, 2-ethylhexylamine, C-aziridine-1-yl-methylamine, 1-(2-aminoethyl)piperazine, 4-(aminomethyl)piperazine, N-methylethylenediamine, N-ethylethylenediamine, N-hexylethylenediamine, picolylamine and adenine.

9. The pH-sensitive block copolymer according to claim 7, wherein the secondary amine-containing diamine compound is at least one selected from the group consisting of piperazine, piperidine, pirrolidine, 3,3-dimethylpiperidine, 4,4'-trimethylene dipiperidine, N,N'-dimethyl ethylene diamine, N,N'-diethyl ethylene diamine, imidazolidine and diazepine.

10. A polymer micelle type drug composition, comprising:
(a) a micelle formed of the block copolymer as claimed in claim 1; and
(b) a physiologically active substance encapsulated in the block copolymer micelle.

11. The polymer micelle type drug composition according to claim 10, wherein the block copolymer micelle has a diameter of 10~1000 nm.

12. The pH-sensitive block copolymer as claimed in claim 1 prepared by the method represented by the following reaction scheme 1:

[Reaction Scheme 1]

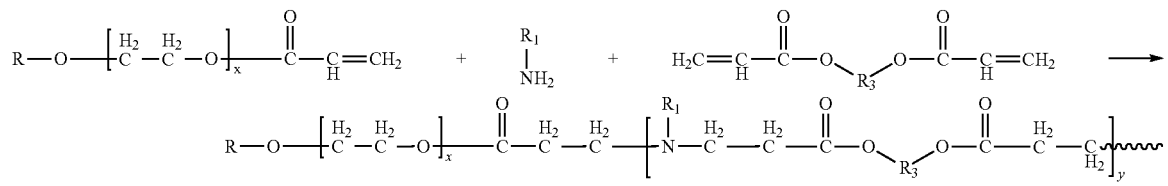

wherein R is a hydrogen atom or C1-C5 alkyl group and x is a natural number ranging from 1 to 10,000;
$R_1$ is a C1-C20 alkyl group;
$R_3$ is a C1-C30 alkyl group; and
Y is a natural number ranging from 1 to 10,000.

13. The pH-sensitive block copolymer as claimed in claim 1 prepared by the method represented by the following reaction scheme 2:

[Reaction Scheme 2]

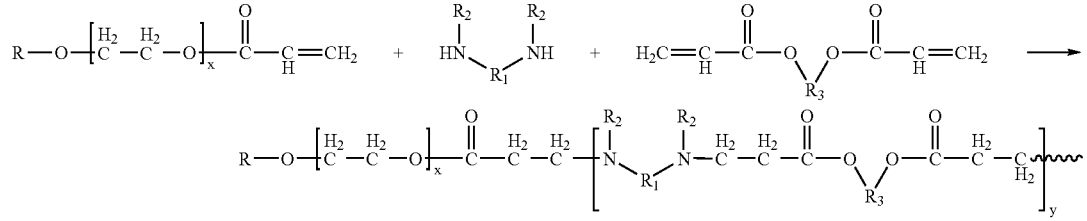

wherein R is a hydrogen atom or C1-C5 alkyl group and x is a natural number ranging from 1 to 10,000;
each of $R_1$ and $R_2$ is a C1-C20 alkyl group;
$R_3$ is a C1-C30 alkyl group; and
Y is a natural number ranging from 1 to 10,000.

14. The pH-sensitive block copolymer as claimed in claim 1 prepared by the method represented by the following reaction scheme 3:

[Reaction Scheme 3]

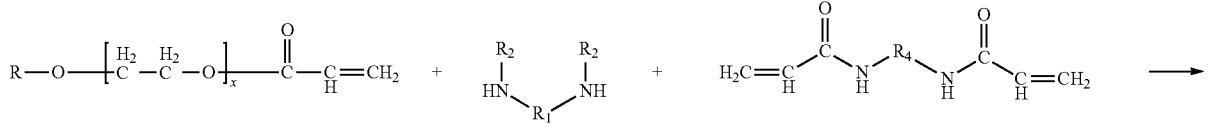

-continued
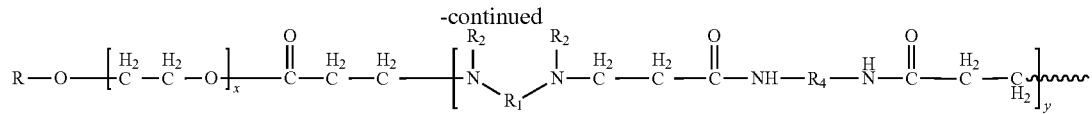
wherein R is a hydrogen atom or C1-C5 alkyl group and x is a natural number ranging from 1 to 10,000;
each of $R_1$ and $R_2$ is a C1-C20 alkyl group;
$R_4$ is a C1-C20 alkyl group; and
Y is a natural number ranging from 1 to 10,000.
* * * * *